(12) United States Patent
Bergmann et al.

(10) Patent No.: US 6,213,056 B1
(45) Date of Patent: Apr. 10, 2001

(54) AUTOMATIC HORSE WALKER

(76) Inventors: Martin Bergmann, Ahornweg 7, Hösbach (DE), 63768; Sebastian Hunnikens, Mohringhook 21, Ochtrup (DE), 48607

( * ) Notice: Subject to any disclaimer, the term of this patent is extended or adjusted under 35 U.S.C. 154(b) by 0 days.

(21) Appl. No.: 09/337,153

(22) Filed: Jun. 21, 1999

(51) Int. Cl.⁷ ................................................ A01K 15/00
(52) U.S. Cl. ........................ 119/704; 119/721; 119/701
(58) Field of Search .................... 119/704, 712, 119/719, 720, 721, 701

(56) References Cited

U.S. PATENT DOCUMENTS

| | | |
|---|---|---|
| 821,395 * | 5/1906 | Arthurs . |
| 2,831,457 | 4/1958 | McMurry . |
| 3,291,099 * | 12/1966 | Crane et al. . |
| 3,773,018 | 11/1973 | Profughi . |
| 3,815,551 | 6/1974 | Losaw . |
| 3,827,402 | 8/1974 | Laurenz . |
| 3,965,866 * | 6/1976 | Lorentz et al. . |
| 3,981,274 | 9/1976 | Curtis . |
| 4,128,200 * | 12/1978 | Jones et al. ............................... 231/7 |
| 4,265,199 | 5/1981 | Hopkins . |
| 4,275,686 | 6/1981 | MacGillivray . |
| 4,766,848 | 8/1988 | Rocco et al. . |
| 4,997,127 * | 3/1991 | McEwen ................................... 231/7 |
| 5,630,380 * | 5/1997 | Karanges ............................. 119/704 |
| 6,055,939 * | 5/2000 | Stelljes ................................. 119/712 |

FOREIGN PATENT DOCUMENTS

2249012 * 4/1992 (GB) .

* cited by examiner

*Primary Examiner*—Peter M. Poon
*Assistant Examiner*—Yvonne R. Abbott
(74) *Attorney, Agent, or Firm*—Brent A. Capehart; Fellers, Snider, Blankenship, Bailey & Tippens

(57) ABSTRACT

An animal walking apparatus having a plurality of rails where each rail is mounted at one end to a rotatable drive means and having a gate at its other end. An electric current is attached to each rail and its respective gate to provide stimulus to provoke an animal to move forward.

20 Claims, 4 Drawing Sheets

AUTOMATIC HORSE WALKER

BACKGROUND OF THE INVENTION

1. Field of the Invention

The invention relates to mechanical horse walkers.

2. Description of the Related Art

Horse trainers commonly use horse walkers for the purposes of forcing a horse to walk during a "cool down" period after a race in order to protect the horse from muscle stiffening and respiratory infections, training a horse and breaking a horse to harness or halter when the horse is young. Traditionally, the horse walker was an exercise boy who led the horse by the reins. In more modern times, several types of mechanical devices have been developed to motivate a horse to move in a walking gait.

For example, Profughi (U.S. Pat. No. 3,773,018) discloses a horse walker apparatus having spokes connected to a rotating hub. A horse is tethered to a spoke and pulled along when the hub rotates.

Losaw (U.S. Pat. No. 3,815,551) discloses a mechanical horse walker that is portable. Curtis (U.S. Pat. No. 3,981,274) discloses a mechanical horse walker with a continuously variable transmission for preventing injury to a horse.

The mechanical horse walkers disclosed in the prior art teach the use a tether in which a horse is pulled in a circle by a rotating arm. This presents several problems. The mechanical force provided by the rotating arm pulling the horse's tether is sometimes inadequate impetus for a balking horse to keep moving. Some of the existing art mechanical horse walkers have slip clutches or other devices to prevent injury to the horse. However, these devices do not provide any impetus to keep the horse moving except for a pull on the tether. Thus, a balking race horse may injure himself by failing to keep walking after a race.

Another problem with mechanical horse walkers of the existing art is that they do present a hazard to a horse, because a mechanical malfunction of a protective device, such as a slip clutch, may result in the horse being dragged by the horse walker.

Yet another problem of mechanical horse walkers of the existing art is, because they use a tether, they restrict the movement of the horse's head; and restrict the horse to a narrow circular path, as limited by the length of the tether.

SUMMARY OF THE INVENTION

The present invention is for a mechanical horse walker which provides an electrical stimulus to provoke forward movement of a horse. The mechanical horse walker has a plurality of radial arms connected to a vertical shaft at one end and has a grid assembly connected at the other end. The vertical shaft is connected to a vertical shaft support assembly. This assembly is supported by an apparatus support assembly and has the ability to rotate in a circular fashion due to a drive means. A bearing housing assembly provides the means for the vertical shaft assembly to rotate.

The electrical stimulus is provided by electrifying the vertical shaft support assembly, vertical shaft, radial arms and/or associated grids by an electrifying means. The electrifying means could include an electrical wire being in contact with either the vertical shaft support assembly, vertical shaft, radial arms and/or associated grids. When the radial arm comes into contact with a horse, the horse is motivated to move away from the radial arm in a circular motion.

A pair of circular fences corral the horses into a desired path.

Accordingly, it is a principal object of the present invention to provide a sufficient impetus to keep a horse moving in a forward direction.

Another object of the present invention is to provide a sufficient impetus to keep a horse moving in a forward direction, wherein such impetus is by electrical stimulus.

Another object of the present invention is to provide a mechanical horse walker which does not pull a horse by a tether.

Still another object of the present invention is to provide a mechanical horse walker which does not restrict movement of a horse's head during use.

A further object of the present invention is to provide a mechanical horse walker which does not restrict movement of the horse to the length of a tether.

DESCRIPTION OF THE PREFERRED EMBODIMENTS

Figure 1:
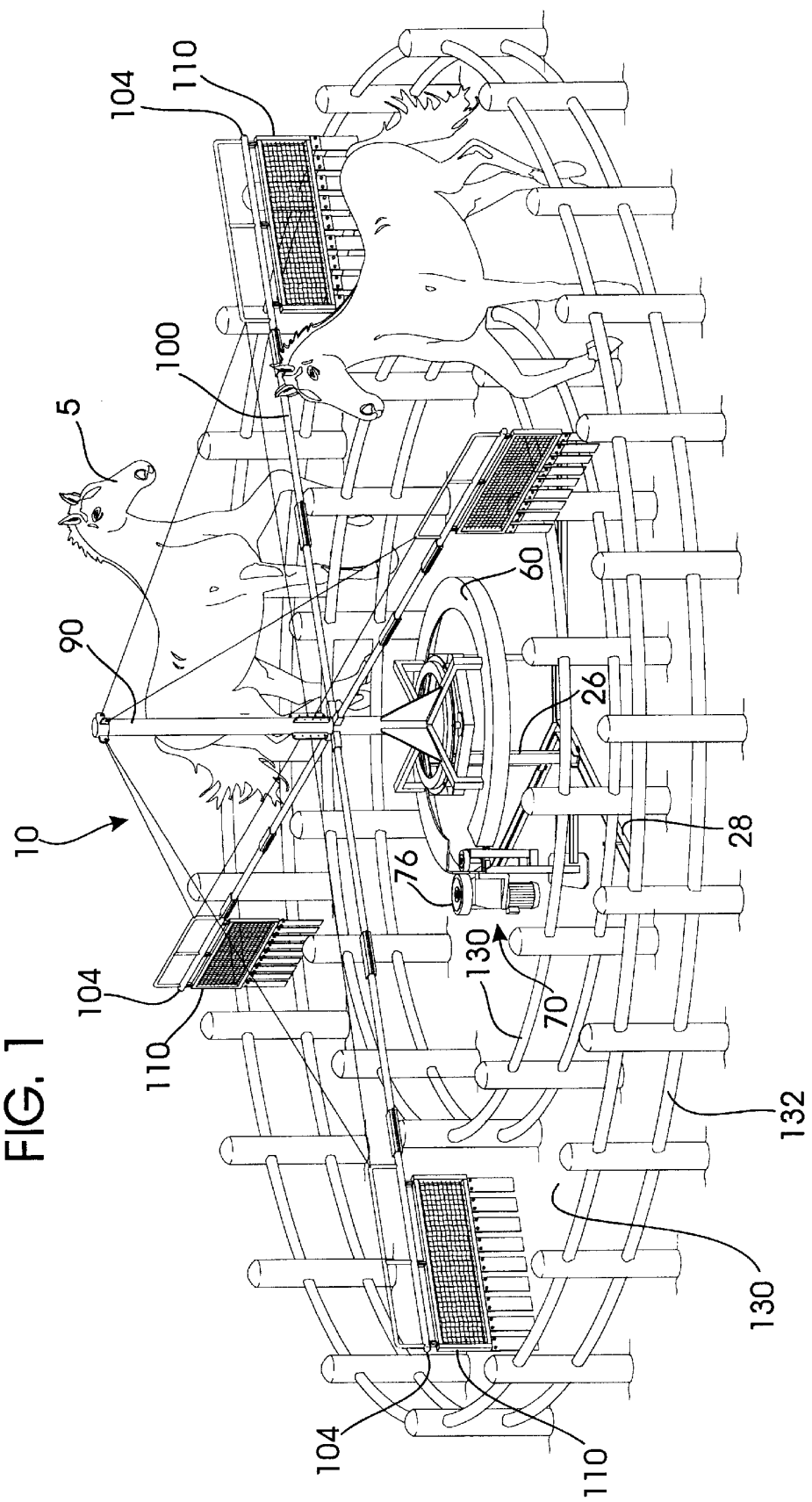
FIG. 1 is an elevation view of a mechanical horse walker of the present invention.

Like numbers in the various figures indicate corresponding parts of the various embodiments of the present invention.

Referring to FIGS. 1 through 5, mechanical horse walker 10 is generally illustrated by having plurality of radial arms 100 connected to a vertical shaft 90. Vertical shaft 90 is rotated in a circular fashion by vertical shaft support assembly 50. Vertical shaft support assembly 50 is supported by an apparatus support means 20 and is rotated by drive means assembly 70. Electrical stimulus is provided to vertical shaft support assembly 50 by electrical means 120.

Figure 2:
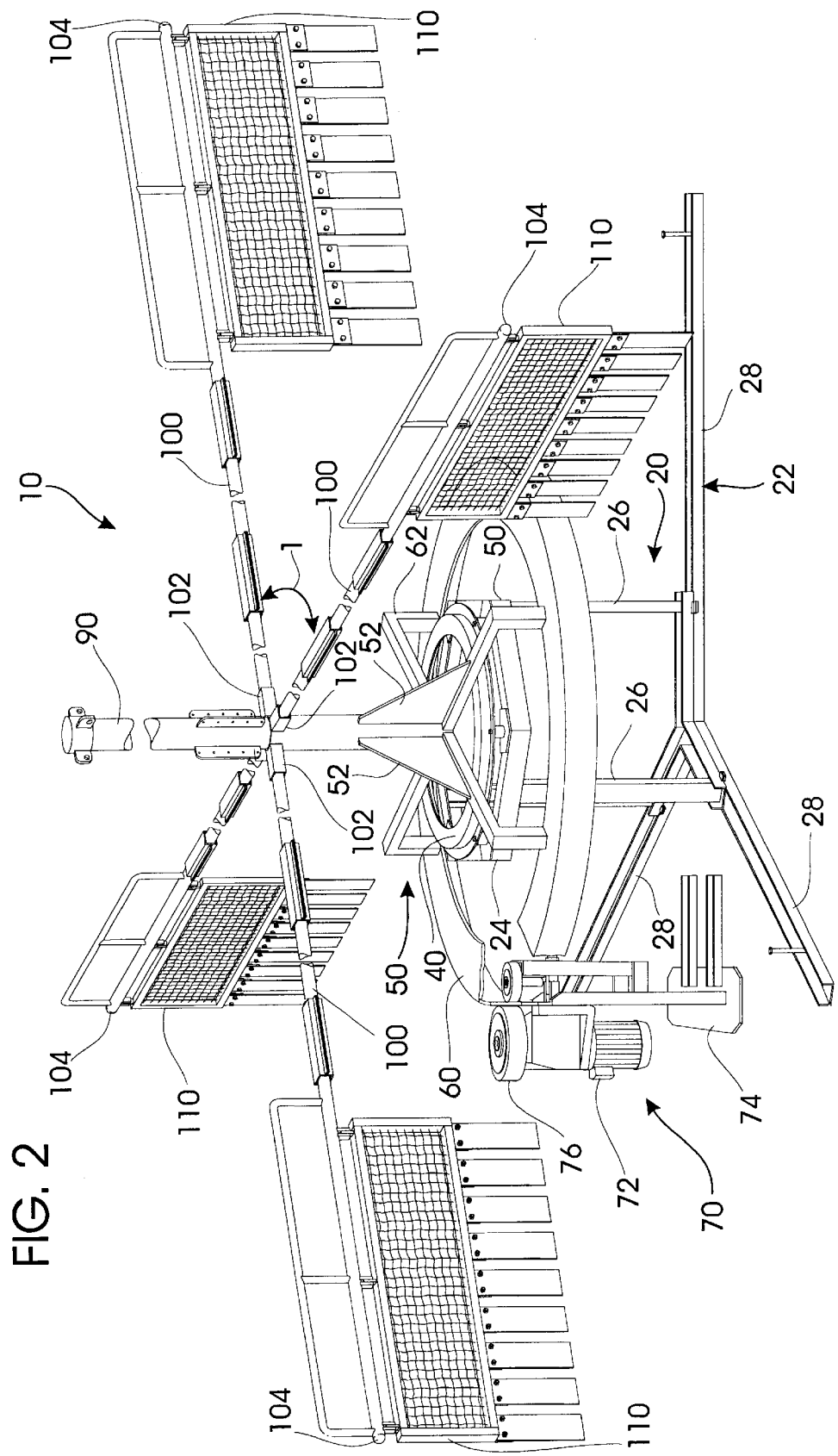
FIG. 2 is an exploded elevation view of a central portion of the mechanical horse walker of the present invention.

As generally shown in FIGS. 1 and 2, the preferred embodiment of the each of the radial arms 100 is illustrated as having a shaft end 102 and a distal end 104. The shaft end is attached to vertical shaft 90. A grid assembly 110 is attached to distal end 104. Each radial arm 100 is spaced around vertical shaft 90, and when placed in conjunction with inner fence 130 and outer fence 132, creates a plurality of enclosures 130. A horse 5 is positioned with an enclosure 130. When walker 10 is activated, an electrical current is provided to each grid assembly 110. If a grid assembly 110 comes in contact with the horse 5, an electrical stimulus causes horse 5 to move in a forward direction. Alternatively, if horse 5 is moved forward in a manner which is too fast, a forward grid 110 would provoke horse 5 to slow its speed.

Figure 3:
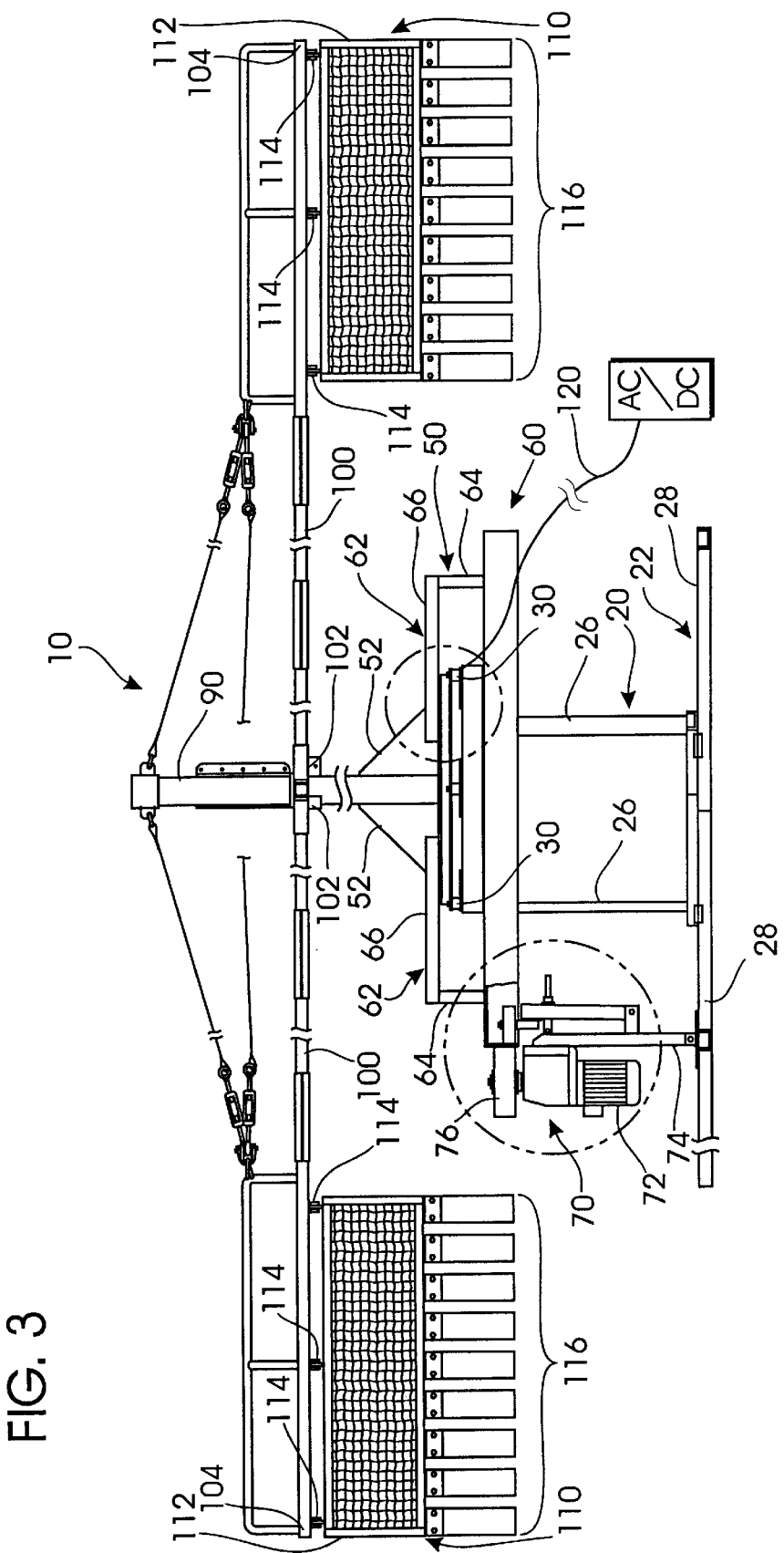
FIG. 3 is an enlarged detail view of the portion of the mechanical horse walker near the electric motor.

As generally shown in FIG. 3, grid assembly 110 is attached to the distal end 104 of radial arm 100 by hangers 114. In the preferred embodiment, grid assembly 110 has a upper grid 112 and a plurality of streamers 116.

As generally shown in FIGS. 2 and 3, vertical shaft 90 is connected to vertical shaft support assembly 50. In the preferred embodiment, vertical shaft support assembly 50 has a rotational ring 60, rotational ring support assembly 62 and a circular bearing means 40.

Figure 5:
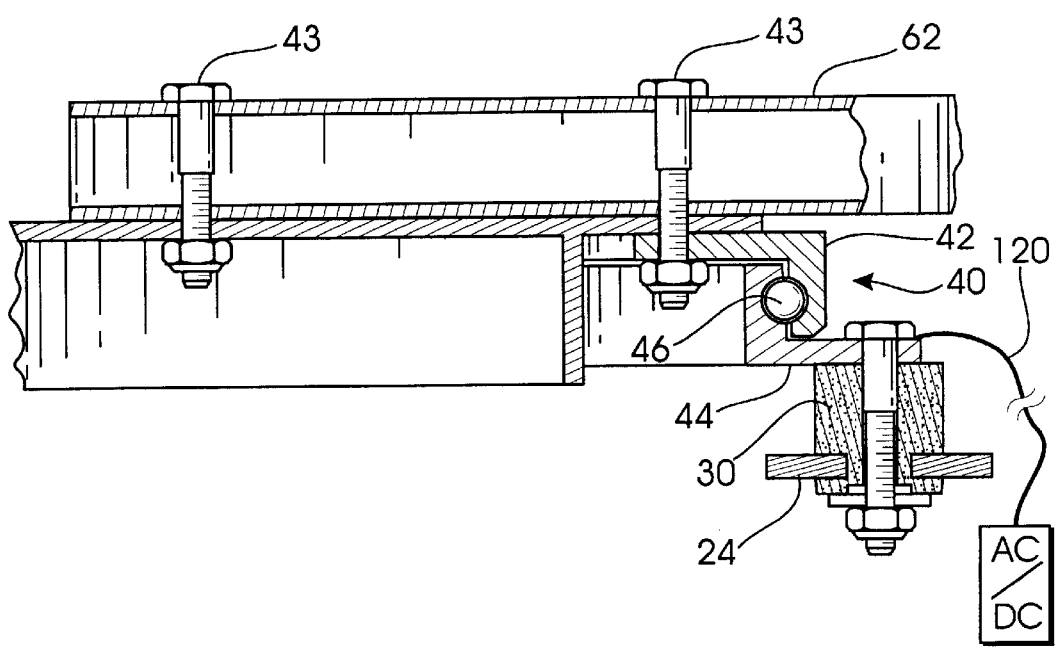
FIG. 5 is a detailed elevation view of a rail arm with a grid.

As shown in FIGS. 3 and 5, circular bearing means 40 has an upper circular bearing housing 42, a lower circular bearing housing 44 and bearing 46. Connected to upper circular bearing housing 42 is a rotational ring support assembly 62 having a plurality of vertical rotational ring supports 64 and a plurality of horizontal rotational ring supports 66. Each horizontal rotational ring supports 66 is connected by securing means 43 to upper circular bearing housing 42. Each vertical rotational ring support 64 is connected to a horizontal rotational ring support 66 at one end and rotational ring 60 at the other end. Vertical shaft 90 is secured by securing means 43 to the horizontal rotational ring supports 66. Triangular fillets 52 are attached to vertical shaft 90 and each horizontal rotational ring support 66 in a vertical position.

As generally shown in FIGS. 3 and 5, an electrical stimulus is provided to horse walker 10 by electrical means 120. Electrical means 120 is able to connect to various parts of horse walker 10 in order to electrify the grid assemblies 110. The preferred location to connect electrical means 120 is at lower circular bearing housing 44. Once electrical current is supplied to electrical means 120, all the parts including the radial arms 100 and grid assemblies 110 above the lower circular bearing housing 44 would be electrified. Another location, not shown, where electrical means is attached would be directly to each grid assembly 110.

As generally shown in FIGS. 2 and 3, vertical shaft support assembly 50 is supported by apparatus support means 20. The preferred embodiment of apparatus support means 20 has an apparatus support base 22, a horizontal apparatus support ring 24, and a plurality of vertical apparatus support legs 26 connected to apparatus support base 22 and supporting horizontal apparatus support ring 24. In the preferred embodiment, apparatus support base is a series of three members 28 which provide stable support for the vertical apparatus support legs 26.

As generally shown in FIGS. 3 and 5, in the preferred embodiment of the present invention, a plurality of isolators 30 are secured between the horizontal apparatus support ring 24 and the lower bearing housing 44. These isolators provide support to the vertical support assembly 50 and act as an electrical current break such that all metal components attached above the isolators 30 could be electrified and all metal components attached below the isolators 30 are not electrified.

Figure 4:
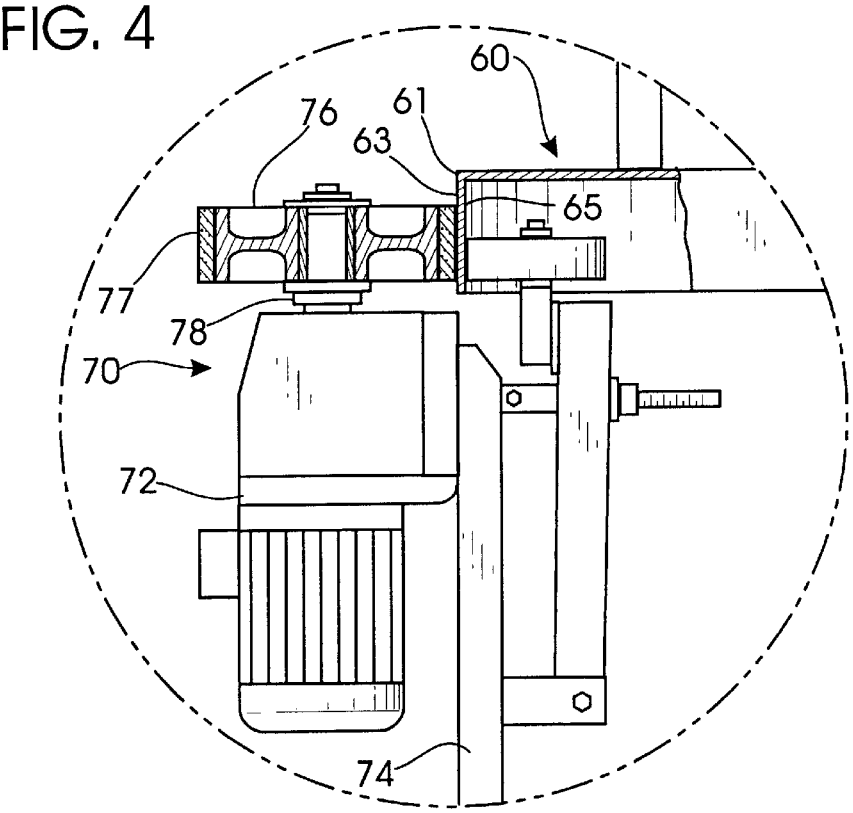
FIG. 4 is a top view of the mechanical horse walker of the present invention.

As shown in FIG. 4, rotational ring 60 has an edge 61 having an outer surface 63 and an inner surface 65.

A drive means assembly 70 provides rotational movement to rotational ring 60. In the preferred embodiment, drive means assembly 70 has a drive means 72, such as an electrical or gas powered motor, connected to a drive means support assembly 74. A drive wheel 76 is connected the drive shaft 78 of drive means 72.

Drive means assembly 70 is positioned is such a fashion such that drive shaft 78 is substantially parallel to vertical shaft 90. Drive wheel 76 is a frictional edge 77 is biased against the outer surface 63 of edge 61 of rotational ring 60, so that rotation of the motor shaft 78 causes rotation of rotational ring 60. Vertical shaft 90 and each radial arm 100 is likewise rotated.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of terms herein, the more specific meaning is meant.

While the invention has been described with a certain degree of particularity, it is manifest that many change may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

The present invention has been described in relation to the drawings attached hereto, but it should be understood that other and further modifications, apart from those shown or suggested herein, may be made within the spirit and scope of this invention.

What is claimed is:

1. A mechanical horse walker for a horse, comprising:
   (a) a vertical shaft connected to a rotatable vertical shaft support assembly;
   (b) at least one radial arm rigidly attached to said vertical shaft, each radial arm extending outwardly from said vertical shaft and having a grid assembly attached thereto;
   (c) drive means assembly to rotate said vertical shaft support assembly in a circular motion;
   (d) an apparatus support assembly providing support to said vertical shaft support assembly, wherein said apparatus support assembly having a base, a horizontal apparatus support ring connected to said vertical shaft support assembly; and a plurality of vertical apparatus support legs connected between said base and said horizontal apparatus support ring;
   (e) electrical stimulation means attached to said vertical shaft support assembly to provoke forward movement of the horse; and
   (f) a circular fence to restrict the horse to an enclosure swept by said radial arms.

2. The mechanical horse walker of claim 1, wherein said vertical shaft support assembly is defined as having a rotation ring assembly having a rotation ring and a rotation ring support assembly, said rotation ring having an edge with an outer surface and an inner surface, and a circular bearing means connected to said rotation ring support assembly and connected to said apparatus support assembly, wherein said vertical shaft is connected to said circular bearing means.

3. The device of claim 2 wherein said electrical stimulation means comprises:
   an electrical power supply;
   a wire with a first end and a second end, said first end connected to said electrical power supply and said second end connected to said vertical shaft support assembly.

4. The device of claim 2 wherein said drive means assembly comprises:
   a drive means support assembly;
   a drive means connected to said drive means support assembly; and
   a drive wheel having a first frictional edge connected to said drive means, wherein said first frictional edge is biased against said outer surface of said edge of said rotation ring.

5. The device of claim 4 wherein said drive means is an electrical motor having a drive shaft.

6. The device of claim 4 wherein said drive means is a fuel powered motor having a drive shaft.

7. The device of claim 4 wherein said drive means support assembly comprises:
   a drive means base;
   a vertical support connected between said drive means base and said drive means providing support to said drive means.

8. The device of claim 4 wherein said drive means support assembly further comprising:
   a counter wheel having a second frictional edge connected to a counter wheel support assembly, wherein said second frictional edge is biased against said inner surface of said edge of said rotation ring.

9. A mechanical horse walker for a horse, comprising:
   (a) a vertical shaft connected to a rotatable vertical shaft support assembly, said vertical shaft support assembly having a rotation ring assembly having a rotation ring and a rotation ring support assembly, said rotation ring having an edge with an outer surface and an inner surface, a circular bearing means connected to said rotation ring support assembly and connected to said apparatus support assembly, wherein said vertical shaft is connected to said circular bearing means;
   (b) at least one radial arm rigidly attached to said vertical shaft, each radial arm extending outwardly from said vertical shaft and having a grid assembly attached thereto;
   (c) drive means assembly to rotate said vertical shaft support assembly in a circular motion;
   (d) an apparatus support assembly providing support to said vertical shaft support assembly;
   (e) electrical stimulation means attached to said vertical shaft support assembly to provoke forward movement of the horse; and
   (f) a circular fence to restrict the horse to an enclosure swept by said radial arms.

10. The device of claim 9 wherein said circular bearing means comprises:
    an upper bearing housing, wherein said vertical shaft is connected thereto;
    a lower bearing housing connected to said apparatus support assembly;
    a bearing positioned between said upper bearing housing and lower bearing housing to provide upper bearing housing the ability to freely rotate.

11. The device of claim 10 wherein said lower bearing housing is further defined as being connected to said horizontal apparatus support ring by a plurality of isolators.

12. A mechanical horse walker for a horse, comprising:
    (a) a vertical shaft connected to a rotatable vertical shaft support assembly, said vertical shaft support assembly having a rotation ring assembly having a rotation ring and a rotation ring support assembly, said rotation ring having an edge with an outer surface and an inner surface, and a circular bearing means connected to said rotation ring support assembly and connected to said apparatus support assembly, wherein said vertical shaft is connected to said circular bearing means;
    (b) at least one radial arm rigidly attached to said vertical shaft, each radial arm extending outwardly from said vertical shaft and having a grid assembly attached thereto;
    (c) drive means assembly to rotate said vertical shaft support assembly in a circular motion; said drive means assembly having a drive means connected to a drive means support assembly; and a drive wheel having a first frictional edge connected to said drive means, wherein said first frictional edge is biased against said outer surface of said edge of said rotation ring;
    (d) an apparatus support assembly providing support to said vertical shaft support assembly, said apparatus support assembly having a base, a horizontal apparatus support ring connected to said vertical shaft support assembly, and a plurality of vertical apparatus support legs connected between said base and said horizontal apparatus support ring;
    (e) electrical stimulation means attached to said vertical shaft support assembly to provoke forward movement of the horse; and
    (f) a circular fence to restrict the horse to an enclosure swept by said radial arms.

13. The device of claim 12 wherein said circular bearing means comprises:
    an upper bearing housing, wherein said vertical shaft is connected thereto;
    a lower bearing housing connected to said apparatus support assembly;
    a bearing positioned between said upper bearing housing and lower bearing housing to provide upper bearing housing the ability to freely rotate.

14. The device of claim 13 wherein said lower bearing housing is further defined as being connected to said horizontal apparatus support ring by a plurality of isolators.

15. The device of claim 12 wherein said drive means is an electrical motor having a drive shaft.

16. The device of claim 12 wherein said drive means is a fuel powered motor having a drive shaft.

17. The device of claim 12 wherein said electrical stimulation means comprises:
    an electrical power supply;
    a wire with a first end and a second end, said first end connected to said electrical power supply and said second end connected to said vertical shaft support assembly.

18. The device of claim 12 wherein said drive means support assembly comprises:
    a drive means base;
    a vertical support connected between said drive means base and said drive means providing support to said drive means.

19. The device of claim 12 wherein said drive means support assembly further comprising:
    a counter wheel having a second frictional edge connected to a counter wheel support assembly, wherein said second frictional edge is biased against said inner surface of said edge of said rotation ring.

20. A mechanical horse walker for a horse, comprising:
    (a) a vertical shaft connected to a rotatable vertical shaft support assembly, said vertical shaft support assembly having a rotation ring assembly having a rotation ring and a rotation ring support assembly, said rotation ring having an edge with an outer surface and an inner surface, and a circular bearing means connected to said rotation ring support assembly and connected to said apparatus support assembly, wherein said vertical shaft is connected to said circular bearing means;
    (b) at least one radial arm rigidly attached to said vertical shaft, each radial arm extending outwardly from said vertical shaft and having a grid assembly attached thereto;

(c) drive means assembly to rotate said vertical shaft support assembly in a circular motion, said drive means assembly having a drive means connected to a drive means support assembly; and a drive wheel having a first frictional edge connected to said drive, wherein said first frictional edge is biased against said outer surface of said edge of said rotation ring, said drive means support assembly having a drive means base, a vertical support connected between said drive means base and said drive means providing support to said drive means, and a counter wheel having a second frictional edge connected to a counter wheel support assembly, wherein said second frictional edge is biased against said inner surface of said edge of said rotation ring;

(d) an apparatus support assembly providing support to said vertical shaft support assembly, said apparatus support assembly having a base, a horizontal apparatus support ring connected to said vertical shaft support assembly, and a plurality of vertical apparatus support legs connected between said base and said horizontal apparatus support ring;

(e) electrical stimulation means attached to said vertical shaft support assembly to provoke forward movement of the horse, said electrical stimulation means having an electrical power supply, a wire with a first end and a second end, said first end connected to said electrical power supply and said second end connected to said vertical shaft support assembly; and (f) a circular fence to restrict the horse to an enclosure swept by said at least one radial arm.

* * * * *